US010630189B1

(12) United States Patent
Ouyang et al.

(10) Patent No.: US 10,630,189 B1
(45) Date of Patent: Apr. 21, 2020

(54) SYSTEM AND METHOD FOR EXTENDING POWER SUPPLY UNIT HOLDUP TIME

(71) Applicant: QUANTA COMPUTER INC., Taoyuan (TW)

(72) Inventors: Kuang-Hua Ouyang, Taoyuan (TW); Shu-Chen Ni, Taoyuan (TW); Chin-Hsiang Chan, Taoyuan (TW); Yue-Hwa Shih, Taoyuan (TW); Chun-Lung Cheng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/413,285

(22) Filed: May 15, 2019

Related U.S. Application Data

(60) Provisional application No. 62/758,109, filed on Nov. 9, 2018.

(51) Int. Cl.
*H02M 3/335* (2006.01)
*H02M 3/158* (2006.01)
(Continued)

(52) U.S. Cl.
CPC ........ *H02M 3/33576* (2013.01); *G06F 1/263* (2013.01); *H02J 7/0068* (2013.01);
(Continued)

(58) Field of Classification Search
CPC ... H02M 2001/0067; H02M 2001/007; H02M 2001/0083; H02M 2001/0096; H02M 1/32; H02M 2001/322; H02M 2001/325; H02M 3/33538; H02M 3/33569; H02M 3/33576
See application file for complete search history.

(56) References Cited

U.S. PATENT DOCUMENTS

| 5,737,163 A * | 4/1998 | Newlin ............... H02H 7/1225 307/129 |
| 8,363,438 B2 * | 1/2013 | Lo .................... H02M 3/33561 363/21.04 |

(Continued)

FOREIGN PATENT DOCUMENTS

| CN | 101488716 A | 7/2009 |
| JP | H1198829 A | 4/1999 |

(Continued)

OTHER PUBLICATIONS

Extended European Search Report for EP Application No. 19194910.6, dated Jan. 23, 2020.

(Continued)

*Primary Examiner* — Gary L Laxton
(74) *Attorney, Agent, or Firm* — Nixon Peabody LLP; Zhou Lu

(57) ABSTRACT

A system and method is directed to charging and discharging an energy-tank capacitor of a power supply unit (PSU) in a computing system. The PSU has a forward converter, a buck converter, a switch box, and an option box. The forward converter has a transformer. A primary winding of the transformer is coupled to an input of the PSU, while a secondary winding of the transformer is coupled to an output of the PSU. Two or more components of the forward converter are shared with the buck converter to support the functionality of the buck converter when it is enabled. The switch box has a power switch and a controller switch connected to the forward converter. The energy stored on the energy-tank capacitor is capable of supporting power consumption of the server system during a hold-up time, when an input power to the PSU is interrupted.

17 Claims, 4 Drawing Sheets

(51) Int. Cl.
  *H02J 7/00* (2006.01)
  *G06F 1/26* (2006.01)
  *H02M 1/08* (2006.01)
  *H02J 7/34* (2006.01)

(52) U.S. Cl.
  CPC ............. *H02M 1/08* (2013.01); *H02M 3/158* (2013.01); *H02J 7/345* (2013.01)

(56) References Cited

U.S. PATENT DOCUMENTS

| | | |
|---|---|---|
| 2002/0071300 A1 | 6/2002 | Jang et al. |
| 2003/0220026 A1 | 11/2003 | Oki et al. |
| 2009/0184582 A1 | 7/2009 | Hwang |
| 2013/0027981 A1 | 1/2013 | Liu et al. |

FOREIGN PATENT DOCUMENTS

| | | |
|---|---|---|
| TW | 201123697 A | 7/2011 |
| TW | 201417467 A | 5/2014 |
| TW | 201818640 A | 5/2018 |

OTHER PUBLICATIONS

TW Office Action for Application No. 108125037, dated Feb. 3, 2020, w/ First Office Action Summary.
TW Search Report for Application No. 108125037, dated Feb. 3, 2020, w/ First Office Action.

\* cited by examiner

SYSTEM AND METHOD FOR EXTENDING POWER SUPPLY UNIT HOLDUP TIME

PRIORITY CLAIM

This application claims priority under 35 U.S.C. § 119 to U.S. Provisional Application No. 62/758,109, filed on Nov. 9, 2018. The contents of that application are hereby incorporated by reference in their entirety.

FIELD OF THE INVENTION

The disclosure generally relates to computer server systems, more particularly to power supplies in computer server systems.

BACKGROUND

Modern server farms or data centers typically employ a large number of servers to handle processing needs for a variety of application services. Each server handles various operations and requires a certain level of power consumption to maintain these operations. Some of these operations are "mission critical" operations and interruptions to these operations may lead to significant security breach or revenue losses for users associated with these operations.

However, transient fluctuations of an AC power to data centers can be unpredictable. For example, power interruptions may originate in commercial power grids, which typically utilize long transmission lines vulnerable to weather conditions (e.g., storms and flooding), equipment failure, and major switching operations.

Thus, when an input power is interrupted, power supplies in server systems need to maintain output having a specific voltage range within a hold-up time. The hold-up time is the amount of time that the server systems can continue to run without resetting or rebooting during the input power interruption.

In a conventional power supply unit (PSU), there are two converter stages; one is a boost converter and the second is a following converter. The first boost converter converts the input source to a stable, higher voltage source. The higher voltage source charges a primary capacitor that serves as the primary capacitance tank for supplying power during a hold-up time. The following converter stage converts the high voltage to a required low voltage output voltage source for the power system. The energy stored on the primary tank energy capacitor, $U=C(dV^2)/2$, can support a corresponding server system during the hold-up time once the input source is turned off. However, not only does the booster converter reduce the overall efficiency of the PSU but also the primary energy tank capacitor needs large high voltage capacitance which occupies a big part of the limited space in a power supply unit. Further, high voltage capacitance is expensive. Finally, the primary capacitor is inefficient as it may only delivery 30% of its capacitance storage volume for the output resident power requirement.

SUMMARY

Systems and methods, in accordance with various examples of the present disclosure, solve the above-mentioned problems by providing an improved power supply unit (PSU) in a server system. The PSU comprises a forward converter, a buck converter, a switch box and an option box. The forward converter comprises a transformer. A primary winding of the transformer is coupled to an input of the PSU, while a secondary winding of the transformer is coupled to an output of the PSU. Two or more components of the forward converter are shared with the buck converter to support the functionality of the buck converter when it is enabled. The switch box comprises a power switch device and a controller connected to the forward converter. The energy stored on a secondary energy-tank capacitor on the secondary winding side of the transformer is capable of supporting power consumption of the server system during a hold-up time, when an input power to the PSU is interrupted.

In some implementations, the buck converter comprises a first secondary-side transistor coupled to the secondary winding of the transformer, a power transistor, an inductor, an output capacitor, and a buck controller (e.g., a pulse-width-modulation (PWM) controller). The first transistor, the inductor, and the output capacitor are shared with the forward converter. The buck converter converts the secondary energy-tank capacitor on the secondary winding side of the transformer to an output voltage of the PSU. The capacitor tank can deliver 90% volume of power by the buck converter.

In some implementations, the switch box further comprises a controller switch. The controller switch is connected to the buck controller of the buck converter, and configured to enable the buck converter in response to determining that an input voltage to the PSU is interrupted. The enabled buck converter enables a discharging path between the secondary energy-tank capacitor and the output of the PSU. It can convert the secondary energy-tank capacitor to the stable output voltage of the PSU (e.g., 12V).

In some implementations, the forward converter further comprises a first primary-side transistor connected to the primary winding of the transformer, a second secondary-side transistor connected to the secondary winding of the transformer, and a forward controller (e.g., a PWM controller), together with components shared with the buck converter including the inductor, the first secondary-side transistor, and the output capacitor.

In some implementations, the controller switch of the switch box can determine whether the input voltage of the PSU is in a normal condition. In some implementations, the forward controller can determine whether the input voltage of the PSU operates normally, and send a determination to the controller switch.

In accordance with one aspect of the present disclosure, a method is provided for charging and discharging a secondary energy-tank capacitor of a power supply unit (PSU). The computer-implemented method comprises steps of: monitoring an input voltage of the PSU, the PSU comprising a forward converter that comprises a transformer, a buck converter, and a switch box that comprises a controller switch and the secondary energy-tank capacitor coupled to a secondary winding of the transformer. In the event that the input voltage is in a normal condition, the computer-implemented method disenables the buck converter coupled to the energy-tank, and charges the secondary energy-tank capacitor via a charging path by auxiliary supply to an option box. The option box can be a switch if the auxiliary supply provides high voltage directly, or a low power boost converter if the auxiliary supply provides a low voltage. In the event that the input voltage is in an interruption condition, the method enables the buck converter coupled to the secondary energy-tank, and discharges the secondary energy-tank capacitor to an output of the PSU via the buck converter.

In accordance with another aspect of the present disclosure, a non-transitory computer-readable storage medium storing instructions is provided. The instructions, when executed by a processor of a computing system, cause the processor to perform operations including: monitoring an input voltage of a power supply unit (PSU) of the computing system, the PSU comprising a forward converter that comprises a transformer, a buck converter, and a switch box that comprises a controller switch and the secondary energy-tank capacitor coupled to a secondary winding of the transformer. In the event that the input voltage is in a normal condition, the computer-implemented method disenables the buck converter coupled to the secondary energy-tank, and charges the secondary energy-tank capacitor via a charging path by auxiliary supply to an option box. The option box can comprise a switch if the auxiliary supply provides high voltage directly or a low power boost converter if the auxiliary supply provides a low voltage. In the event that the input voltage is in an interruption condition, the method enables the buck converter coupled to the secondary energy-tank, and discharges the secondary energy-tank capacitor to an output of the PSU via the buck converter.

Additional features and advantages of the disclosure will be set forth in the description that follows, and will in part be obvious from the description; or can be learned by the practice of the principles set forth herein. The features and advantages of the disclosure can be realized and obtained by means of the instruments and combinations particularly pointed out in the appended claims.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims:

DETAILED DESCRIPTION

Figure 1A:
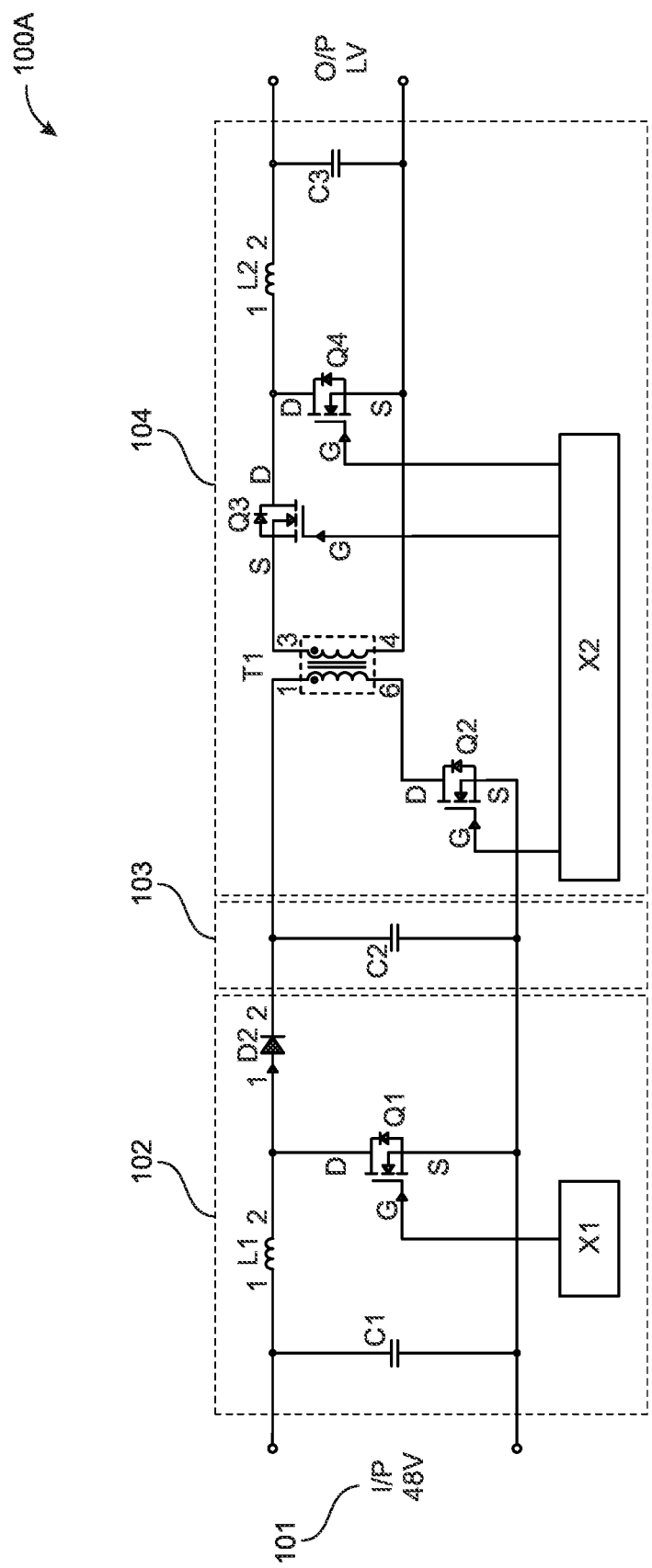
FIG. 1A is a schematic block diagram illustrating a conventional power supply unit (PSU)

The present disclosure can be embodied in many different forms. Representative embodiments are shown in the drawings, and will herein be described in detail. These embodiments are examples or illustrations of the principles of the disclosure but are not intended to limit its broad aspects. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Various examples of the present disclosure provide systems and methods for charging and discharging a secondary energy-tank capacitor of a power supply unit (PSU) in a computing system. The PSU comprises a forward converter, a buck converter, a switch box, and an option box. The forward converter comprises a transformer. A primary winding of the transformer is coupled to an input of the PSU, while a secondary winding of the transformer is coupled to an output of the PSU. Two or more components of the forward converter are shared with the buck converter to support the functionality of the buck converter when it is enabled. The switch box comprises the power switch and a controller connected to the forward converter controller. The option box can be a switch if the auxiliary-supply provides high voltage directly or a low power boost converter if the auxiliary supply provides a low voltage.

Figure 1B:
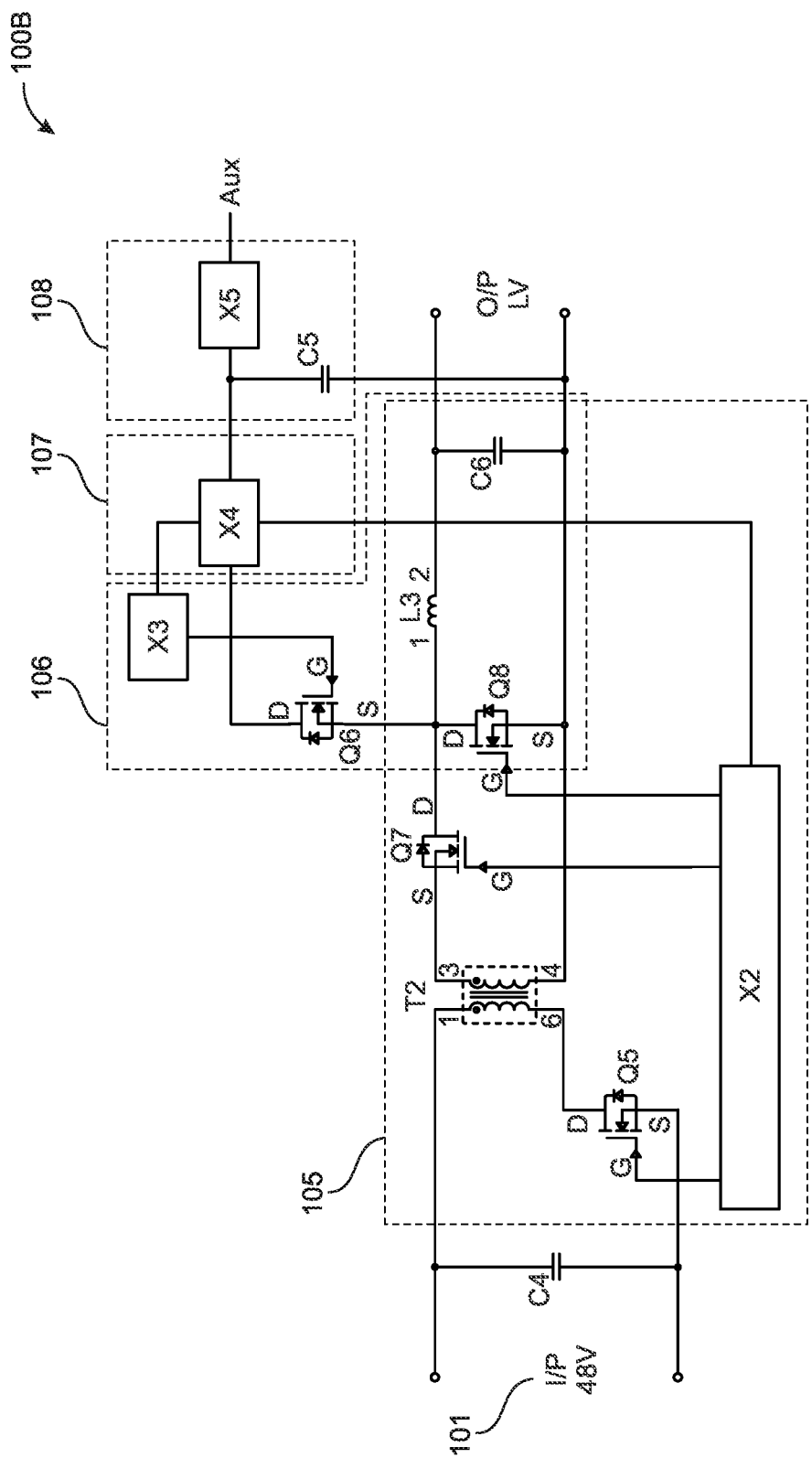
FIG. 1B is a schematic block diagram illustrating an exemplary PSU having a secondary energy-tank capacitor coupled to a secondary winding of a transformer of the PSU, in accordance with an implementation of the present disclosure.

FIG. 1B is a schematic block diagram illustrating an exemplary PSU 100B having a secondary energy-tank capacitor C5 of an option box that provides voltage from an auxiliary or external power supply in accordance with an implementation of the present disclosure. In this example, the PSU 100B comprises an input capacitor C4 connected to an input power 101, a forward converter 105, a buck converter 106, a switch box 107 and an option box 108. Unlike a convention PSU 100A in FIG. 1A, the PSU 100B does not need a boost converter 102 and an expensive energy-tank 103 connected to a forward converter 104 of the PSU 100A. Thus, the exemplary PSU 100B provides a more efficient and cheaper solution, in comparison with the conventional PSU 100A.

In the example of FIG. 1B, the switch box 107 comprises a controller switch X4 connected to the buck converter 106, and is connected to the secondary energy-tank capacitor C5 of the option box 108. The controller switch X4 comprises a controller and a power switch (now shown). The controller receives a signal from the forward converter 105 to turn on/off the power switch of the controller switch X4. When the power switch of the controller switch X4 is turned on, the energy from the secondary energy-tank capacitor C5 passes through the buck converter 106 to an output of the PSU 100B.

The secondary energy-tank capacitor C5 is charged as a higher voltage by an auxiliary or external power supply through the option box 108. The option box 108 can comprise a switch if the auxiliary power supply provides high voltage directly or it may be a low power boost converter if the auxiliary power supply provides a low voltage. The low power boost converter thus converts the low voltage from such an auxiliary power supply to a high voltage for charging the secondary energy-tank capacitor C5.

The forward converter 105 comprises a transformer T2; a first primary-side transistor Q5 connected to the primary winding of the transformer T2; a second secondary-side transistor Q7 connected to the secondary winding of the transformer T2; and a forward controller X2 (e.g., a PWM controller), together with components shared with the buck converter 106, including the inductor L3, a first secondary-side transistor Q8, and an output capacitor C6. The forward controller X2 is connected to the first primary-side transistor Q5, the first secondary-side transistor Q8, the second secondary-side transistor Q7, and the controller switch X4.

The buck converter 106 comprises a power transistor Q6 connected to the first secondary-side transistor Q8 and the second secondary-side transistor Q7, and a buck controller X3 (e.g., a pulse-width-modulation (PWM) controller); together with the components shared with the forward converter 105, including the inductor L3, the first secondary-side transistor Q8, and an output capacitor C6. The buck controller X3 is connected to the controller switch X4. The power transistor Q6 provides a discharging path for the secondary energy-tank capacitor C5 to an output of the PSU 100B.

In this example, the controller switch X4 is connected to the forward controller X2 of the forward converter 105, and can determine whether the input power 101 operates normally. In an event that the input power 101 operates normally, the controller switch X4 can disenable the buck controller X3, and block the secondary energy-tank capacitor C5, the second secondary-side transistor Q7, and the power transistor Q6.

However, in an event that the input power 101 operates abnormally, the controller switch X4 can enable the buck converter 106. The enabled buck converter 106 provides a discharging path for the secondary energy-tank capacitor C5 to the output of the PSU 100B via a discharging path including the power transistor Q6, the second secondary-side transistor Q8, the inductor L3 and the output capacitor C6. Via the discharging path, the secondary energy-tank capacitor C5 can be convert to a low output voltage of the PSU 100B (e.g., 12V).

As illustrated above in FIG. 1B, the improved PSU 100B does not need any high power boost converter, nor an expensive high volume and high voltage energy-tank connected to a primary winding of a transformer; and can provide a highly efficient and low cost solution for a corresponding computing system during a hold-up time.

Figure 2:
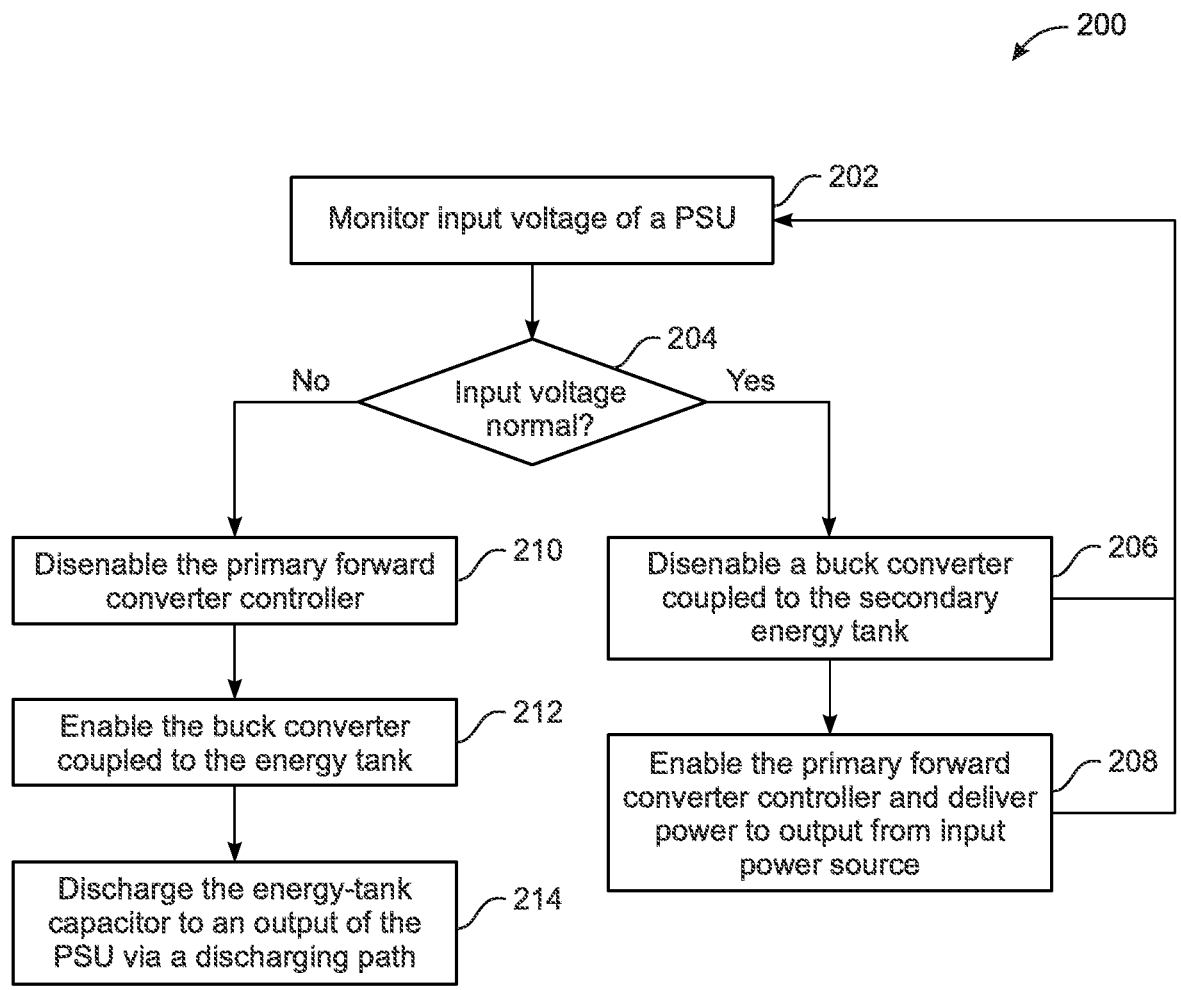
FIG. 2 is an exemplary method for charging and discharging a secondary energy-tank capacitor of a PSU in a computing system, in accordance with an implementation of the present disclosure.

FIG. 2 is an exemplary method 200 for charging and discharging a secondary energy-tank capacitor of a PSU in a computing system, in accordance with an implementation of the present disclosure. It should be understood that the exemplary method 200 is presented solely for illustrative purposes, and that other methods in accordance with the present disclosure can include additional, fewer, or alternative steps performed in similar or alternative orders, or in parallel. The exemplary method 200 starts at step 202 by monitoring an input voltage of an input of the PSU, as illustrated in FIG. 1B. In some implementations, the PSU comprises a forward converter, a buck converter, and a switch box. The forward converter comprises a transformer, a first primary-side transistor connected to a primary winding of the transformer, a second secondary-side transistor connected to a secondary winding of the transformer, and a forward controller, together with components shared with the buck converter including an inductor, a first secondary-side transistor, and an output capacitor. The primary winding of the transformer is coupled to the input of the PSU, while the secondary winding of the transformer is coupled to an output of the PSU. The switch box includes the power switch and a controller connected to the forward converter controller. The option box can be a switch if the auxiliary-supply provides high voltage directly or a low power boost converter if the auxiliary supply provides a low voltage.

At step 204, the controller switch can determine whether the input voltage of the PSU is in a normal condition, as illustrated in FIG. 1B. In some implementations, the forward controller can determine whether the input voltage of the PSU operates normally, and then sends a determination to the controller switch.

At step 206, in an event that the input voltage is in a normal condition, the controller switch can disenable the buck converter of the PSU that is coupled to the secondary energy-tank capacitor. At step 208, the primary converter 105 is enabled to deliver required power to output and charge the secondary energy-tank capacitor via the auxiliary or external supply via the option box, as illustrated in FIG. 1B.

At step 210, in an event that the input voltage is in an abnormal condition. At step 212, the controller switch can enable the buck converter of the PSU. At step 214, the controller switch can discharge the secondary energy-tank capacitor to an output of the PSU via the buck converter, as illustrated in FIG. 1B.

Figure 3:
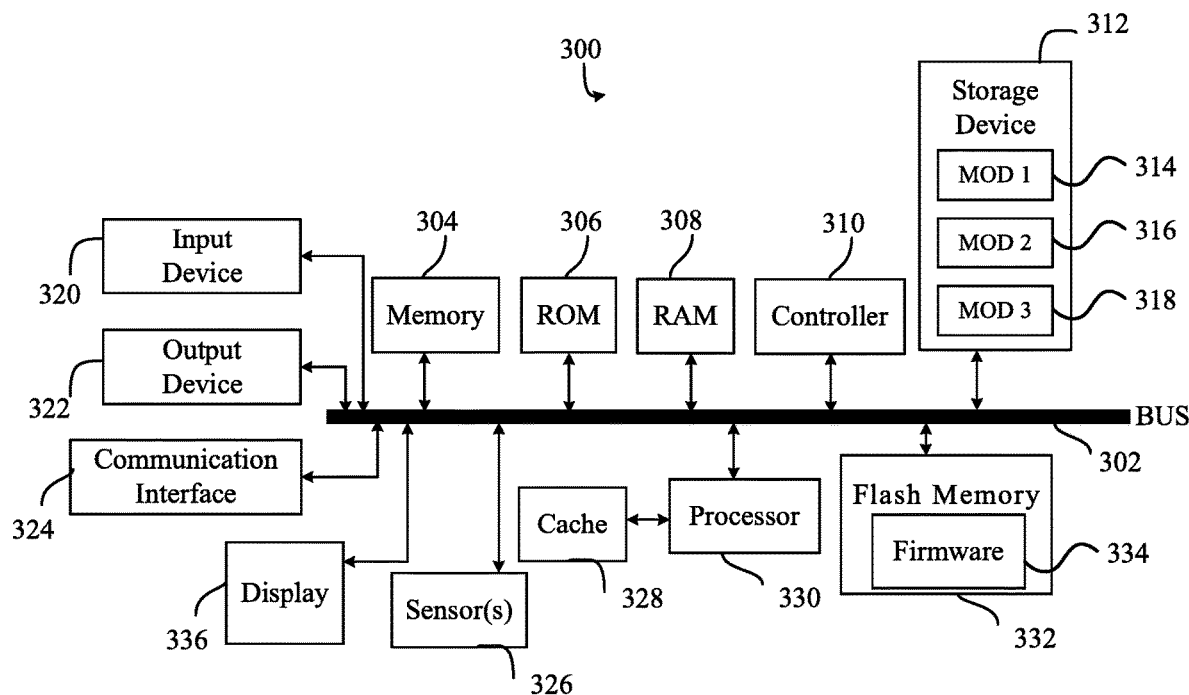
FIGS. 3 and 4 illustrate exemplary systems, in accordance with various examples of the present disclosure.
Figure 4:
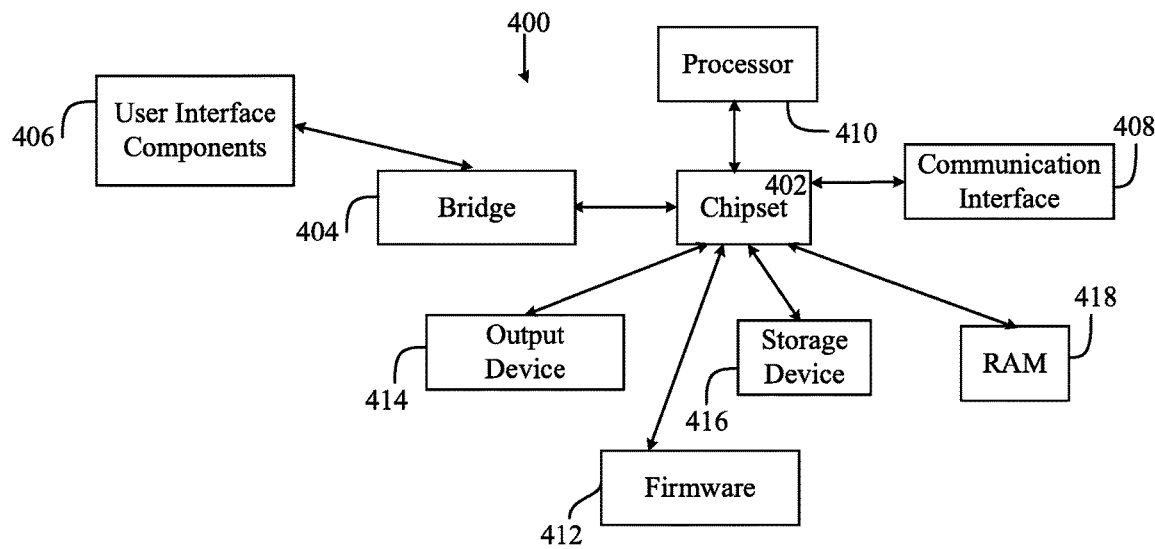

A brief introductory description of example systems and networks, as illustrated in FIGS. 3-4, is disclosed herein. These variations shall be described herein as the various examples are set forth. The present disclosure now turns to FIG. 3.

FIG. 3 illustrates an example computing system 300, in which components of the computing system are in electrical communication with each other using a system bus 302. The system 300 includes a processing unit (CPU or processor) 330 and the system bus 302 that couples various system components, including the system memory 304 (e.g., read only memory (ROM) 306 and random access memory (RAM) 308) and the processor 330. The system 300 can include a cache of high-speed memory that is connected directly with, in close proximity to, or integrated as part of the processor 330. The system 300 can copy data from the memory 304 and/or the storage device 312 to the cache 328 for quick access by the processor 330. In this way, the cache can provide a performance boost for processor 330 while waiting for data. These and other modules can control or be configured to control the processor 330 to perform various actions. Other system memory 304 may be available for use as well. The memory 304 can include multiple different types of memory with different performance characteristics. The processor 330 can include any general purpose processor and a hardware module or software module, such as module 1 314, module 2 316, and module 3 318 embedded in storage device 312. The hardware module or software module is configured to control the processor 330, as well as a special-purpose processor where software instructions are incorporated into the actual processor design. The processor 330 may essentially be a completely self-contained computing system that contains multiple cores or processors, a bus, memory controller, cache, etc. A multi-core processor may be symmetric or asymmetric.

To enable user interaction with the computing device 300, an input device 320 is provided as an input mechanism. The input device 320 can comprise a microphone for speech, a touch-sensitive screen for gesture or graphical input, keyboard, mouse, motion input, and so forth. In some instances, multimodal systems can enable a user to provide multiple types of input to communicate with the system 300. In this example, an output device 322 is also provided. The communications interface 324 can govern and manage the user input and system output.

Storage device 312 can be a non-volatile memory to store data that is accessible by a computer. The storage device 312 can be magnetic cassettes, flash memory cards, solid state memory devices, digital versatile disks, cartridges, random access memories (RAMs) 308, read only memory (ROM) 306, and hybrids thereof.

The controller 310 can be a specialized microcontroller or processor on the system 300, such as a BMC (baseboard management controller). In some cases, the controller 310 can be part of an Intelligent Platform Management Interface (IPMI). Moreover, in some cases, the controller 310 can be embedded on a motherboard or main circuit board of the system 300. The controller 310 can manage the interface between system management software and platform hardware. The controller 310 can also communicate with various system devices and components (internal and/or external), such as controllers or peripheral components, as further described below.

The controller 310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 310 to initiate or conduct specific hardware recovery procedures or operations, as further described below.

The controller 310 can also include a system event log controller and/or storage for managing and maintaining events, alerts, and notifications received by the controller 310. For example, the controller 310 or a system event log controller can receive alerts or notifications from one or more devices and components, and maintain the alerts or notifications in a system event log storage component.

Flash memory 332 can be an electronic non-volatile computer storage medium or chip that can be used by the system 300 for storage and/or data transfer. The flash memory 332 can be electrically erased and/or reprogrammed. Flash memory 332 can include EPROM (erasable programmable read-only memory), EEPROM (electrically erasable programmable read-only memory), ROM, NVRAM, or CMOS (complementary metal-oxide semiconductor), for example. The flash memory 332 can store the firmware 334 executed by the system 300, when the system 300 is first powered on, along with a set of configurations specified for the firmware 334. The flash memory 332 can also store configurations used by the firmware 334.

The firmware 334 can include a basic input/output system or equivalents, such as an EFI (Extensible Firmware Interface) or UEFI (Unified Extensible Firmware Interface). The firmware 334 can be loaded and executed as a sequence program each time the system 300 is started. The firmware 334 can recognize, initialize, and test hardware present in the system 300 based on the set of configurations. The firmware 334 can perform a self-test, such as a POST (Power-on-Self-Test), on the system 300. This self-test can test functionality of various hardware components such as hard disk drives, optical reading devices, cooling devices, memory modules, expansion cards, and the like. The firmware 334 can address and allocate an area in the memory 304, ROM 306, RAM 308, and/or storage device 312, to store an operating system (OS). The firmware 334 can load a boot loader and/or OS, and give control of the system 300 to the OS.

The firmware 334 of the system 300 can include a firmware configuration that defines how the firmware 334 controls various hardware components in the system 300. The firmware configuration can determine the order in which the various hardware components in the system 300 are started. The firmware 334 can provide an interface, such as an UEFI, that allows a variety of different parameters to be set, which can be different from parameters in a firmware default configuration. For example, a user (e.g., an administrator) can use the firmware 334 to specify clock and bus speeds; define what peripherals are attached to the system 300; set thresholds of operation parameters (e.g., fan speeds and CPU temperature limits); and/or provide a variety of other parameters that affect overall performance and power usage of the system 300. While firmware 334 is illustrated as being stored in the flash memory 332, one of ordinary skill in the art will readily recognize that the firmware 334 can be stored in other memory components, such as memory 304 or ROM 306.

System 300 can include one or more sensors 326. The one or more sensors 326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 326 can communicate with the processor 330, cache 328, flash memory 332, communications interface 324, memory 304, ROM 306, RAM 308, controller 310, and storage device 312, via the bus 302, for example. The one or more sensors 326 can also communicate with other components in the system via one or more different means, such as inter-integrated circuit (I2C), general purpose output (GPO), and the like. Different types of sensors (e.g., sensors 326) on the system 300 can also report to the controller 310 on parameters, such as cooling fan speeds, power status, operating system (OS) status, hardware status, and so forth. A display 336 may be used by the system 300 to provide graphics related to the applications that are executed by the controller 310 and/or the processor 330.

FIG. 4 illustrates an example computer system 400 having a chipset architecture that can be used in executing the described method(s) or operations, and in generating and displaying a graphical user interface (GUI). Computer system 400 can include computer hardware, software, and firmware that can be used to implement the disclosed technology. System 400 can include a processor 410, that is representative of a variety of physically and/or logically distinct resources capable of executing software, firmware, and hardware configured to perform identified computations. Processor 410 can communicate with a chipset 402 that can control input to and output from processor 410. In this example, chipset 402 outputs information to output device 414, such as a display; and can read and write information to storage device 416, which can include magnetic media, and solid state media, for example. Chipset 402 can also read data from and write data to RAM 418. A bridge 404 for interfacing with a variety of user interface components 406 can be provided for interfacing with chipset 402. User interface components 406 can include a keyboard, a microphone, touch detection and processing circuitry, and a pointing device, such as a mouse.

Chipset 402 can also interface with one or more communication interfaces 408 that can have different physical interfaces. Such communication interfaces can include interfaces for wired and wireless local area networks, for broadband wireless networks, and for personal area networks. Further, the machine can receive inputs from a user via user interface components 406 and execute appropriate functions, such as browsing functions by interpreting these inputs using processor 410.

Moreover, chipset 402 can also communicate with firmware 412, which can be executed by the computer system 400 when powering on. The firmware 412 can recognize, initialize, and test hardware present in the computer system 400 based on a set of firmware configurations. The firmware 412 can perform a self-test, such as a POST, on the system 400. The self-test can test the functionality of the various hardware components 402-418. The firmware 412 can address and allocate an area in the memory 418 to store an OS. The firmware 412 can load a boot loader and/or OS, and give control of the system 400 to the OS. In some cases, the firmware 412 can communicate with the hardware components 402-410 and 414-418. Here, the firmware 412 can communicate with the hardware components 402-410 and 414-418 through the chipset 402, and/or through one or more other components. In some cases, the firmware 412 can communicate directly with the hardware components 402-410 and 414-418.

It can be appreciated that example systems 300 in FIGS. 3 and 400 in FIG. 4 can have more than one processor (e.g., 330, 410), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A power supply unit (PSU), comprising:
   a forward converter comprising a transformer, a first primary-side transistor connected to a primary winding of the transformer, a second secondary-side transistor connected to a secondary winding of the transformer, a forward controller, and a plurality of shared components including a first secondary-side transistor, an inductor, and an output capacitor;
   a buck converter comprising a power transistor, a buck controller, and the plurality of shared components including the first secondary-side transistor, the inductor, and the output capacitor;
   a switch box comprising a power switch and a controller switch connected to the forward controller; and
   an option box comprising a switch, or a low power boost converter, and a secondary energy tank capacitor connected to the switch box;
   wherein a primary winding of the transformer is coupled to an input of the PSU, while a secondary winding of the transformer is coupled to an output of the PSU,
   wherein the controller switch is configured to
      determine whether an input voltage of the PSU operates normally, and
      disenable the buck converter in response to determining that the input voltage to the PSU is in a normal condition.

2. The computing system of claim 1, wherein the controller switch is further configured to enable the buck converter in response to determining that the input voltage to the PSU is interrupted.

3. The computing system of claim 2, wherein the controller switch is further configured to discharge a secondary energy-tank capacitor to the output of the PSU via a discharging path.

4. The computing system of claim 3, wherein the discharging path comprises the buck converter in an enabled state.

5. The computing system of claim 4, wherein the enabled buck converter is configured to convert the secondary energy-tank capacitor to an output voltage of the PSU.

6. The computing system of claim 1, wherein the controller switch is further configured to charge the energy-tank capacitor via a charging path, including the option box comprising the switch, or the low power boost converter, and the secondary energy tank capacitor connected to the switch box.

7. The computing system of claim 1, wherein the power transistor is a metal-oxide-semiconductor field-effect transistor (MOSFET).

8. A method for charging and discharging an energy tank of a power supply unit (PSU), comprising:
   monitoring an input voltage of the PSU, the PSU comprising a forward converter that comprises a transformer, a buck converter, and a switch box that comprises a controller switch and a power transistor coupled to an option box that comprises a secondary energy-tank capacitor;
   determining, via the controller switch, whether an input voltage of the PSU operates normally;

disenabling, via the controller switch, the buck converter in response to determining that the input voltage to the PSU is in a normal condition;
in an event that the input voltage is in an abnormal condition, enabling the buck converter coupled to the secondary energy-tank; and
discharging the secondary energy-tank capacitor to an output of the PSU via a discharging path.

9. The method of claim 8, wherein the discharging path includes the buck converter.

10. The method of claim 9, wherein the buck converter in an enabled state is configured to convert a high voltage of the secondary energy-tank capacitor to a low output voltage of the PSU.

11. The method of claim 8, wherein the forward converter further comprises a first primary-side transistor connected to a primary winding of the transformer, a second secondary-side transistor connected to a secondary winding of the transformer, a forward controller, and a plurality of shared components including a first secondary-side transistor, an inductor, and an output capacitor.

12. The method of claim 11, wherein the buck converter comprises a power transistor, a buck controller, and the plurality of shared components including the first secondary-side transistor, the inductor, and the output capacitor.

13. The method of claim 8, further comprising:
if the input voltage of the PSU operates normally, charging the secondary energy-tank capacitor via a charging path of the option box.

14. The method of claim 13, wherein the charging path of option box includes a power switch or a low power boost converter.

15. A non-transitory computer-readable storage medium including instructions that, when executed by at least one processor of a computing system, cause the computing system to perform operations comprising:
monitoring an input voltage of a power supply unit (PSU), the PSU comprising a forward converter that comprises a transformer, a buck converter, a switch box, and an option box that comprises a controller switch and a secondary energy-tank capacitor coupled to an auxiliary or external supply;
determining, via the controller switch, whether an input voltage of the PSU operates normally;
disenabling, via the controller switch, the buck converter in response to determining that the input voltage to the PSU is in a normal condition;
in an event that the input voltage is an abnormal condition, enabling the buck converter coupled to the secondary energy-tank; and
discharging the secondary energy-tank capacitor to an output of the PSU via a discharging path including the buck converter.

16. The non-transitory computer-readable storage medium of claim 15, wherein the buck converter in an enabled state is configured to convert the high voltage of the secondary energy-tank capacitor to a low output voltage of the PSU.

17. The non-transitory computer-readable storage medium of claim 15, wherein the forward converter further comprises a first primary-side transistor connected to a primary winding of the transformer, a second secondary-side transistor connected to a secondary winding of the transformer, a forward controller, and a plurality of shared components including a first secondary-side transistor, an inductor, and an output capacitor; and wherein the buck converter comprises a power transistor, a buck controller, and the plurality of shared components including the first secondary-side transistor, the inductor, and the output capacitor.

* * * * *